United States Patent
Cheng et al.

(10) Patent No.: US 7,782,967 B2
(45) Date of Patent: Aug. 24, 2010

(54) METHOD OF FREQUENCY OFFSET COMPENSATION

(75) Inventors: Fang-Chen Cheng, Randolph, NJ (US); Lei Song, Randolph, NJ (US); Robert Soni, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 541 days.

(21) Appl. No.: 11/842,398

(22) Filed: Aug. 21, 2007

(65) Prior Publication Data

US 2008/0232516 A1    Sep. 25, 2008

Related U.S. Application Data

(60) Provisional application No. 60/918,825, filed on Mar. 19, 2007.

(51) Int. Cl.
*H04K 1/10* (2006.01)
(52) U.S. Cl. .................................................. 375/260
(58) Field of Classification Search ................ 375/260, 375/346, 349, 350
See application file for complete search history.

(56) References Cited

U.S. PATENT DOCUMENTS

| | | | | |
|---|---|---|---|---|
| 6,298,227 | B1 * | 10/2001 | Molnar | .................. 455/323 |
| 2007/0060095 | A1 | 3/2007 | Subrahmanya et al. | ... 455/343.1 |
| 2008/0163024 | A1 * | 7/2008 | Lakkis | ..................... 714/752 |
| 2009/0252112 | A1 * | 10/2009 | Shimomura et al. | ......... 370/330 |

OTHER PUBLICATIONS

International PCT Search Report Application No. PCT/US2008/003254 dated Aug. 25, 2008.
Defeng et al., *An Interference-Cancellation Scheme for Carrier Frequency Offsets Correction in OFDMA Systems*, IEEE Transactions on Communications vol. 53, No. 7, Jul. 2005 pp. 1155-1165.
Jan-Jaap van de Beck et al., *A Time and Frequency Synchronization Scheme for Multiuser OFDM*, IEEE Journal on Selected Areas in Communications, vol. 17, No. 11, Nov. 1999 pp. 1900-1914.
Man-On Pun et al.,*Joint Maximum Likelihood Estimation of Carrier Frequency Offset and Channel in Uplink OFDMA Systems*,IEEE Communication Society, Globecom 2004 pp. 3748-3752.

* cited by examiner

*Primary Examiner*—Don N Vo
(74) *Attorney, Agent, or Firm*—Williams, Morgan & Amerson, P.C.

(57) ABSTRACT

The present invention provides a method of processing a baseband signal including user signals transmitted by a plurality of users. The method includes applying frequency offset compensations to the baseband signal, thereby to form respective frequency-shifted baseband signals. Each frequency compensation shifts the baseband signal by a multiple of a selected frequency offset and each resulting frequency-shifted baseband signal includes frequency-shifted user signals. The method also includes assigning at least some of the frequency-shifted user signals to groups. Each group corresponds to one of the frequency compensations and the assignment is carried out so that each group includes frequency-shifted user signals that have an estimated frequency offset that lies within a range determined by the corresponding frequency compensation. The method further includes estimating a frequency offset of each of the user signals based on the frequency-shifted user signal and the frequency compensation of the group including the frequency-shifted user signal.

13 Claims, 8 Drawing Sheets

METHOD OF FREQUENCY OFFSET COMPENSATION

This application claims priority from prior co-pending U.S. provisional patent application Ser. No. 60/918,825 filed on Mar. 19, 2007.

BACKGROUND OF THE INVENTION

1. Field of the Invention

This invention relates generally to communication systems, and, more particularly, to wireless communication systems.

2. Description of the Related Art

Conventional wireless communication systems include a plurality of base stations or other devices for providing wireless connectivity over associated geographic areas that are conventionally referred to as cells. Mobile units located in or near cells associated with the base stations may establish wireless communication links over an air interface between the mobile unit and the base station. The properties of the air interface between the mobile units and the base stations are typically defined by industry-wide agreed-upon standards and protocols. One exemplary set of standards and/or protocols is referred to as Orthogonal Frequency Division Multiple Access (OFDMA). In OFDMA systems, the air interface is formed in a carrier frequency band that encompasses a plurality of sub-carrier frequency bands. Each sub-carrier is transmitted in a narrow frequency band centered on a sub-carrier frequency that is orthogonal to all of the other sub-carrier frequencies. Orthogonality of the sub-carrier frequencies permits multiple mobile units to establish concurrent wireless communication links with each base station with minimal inter-carrier interference. Using multiple sub-carriers may also help reduce multipath frequency selective fading of transmission between the mobile unit and the base station.

Figure 1:
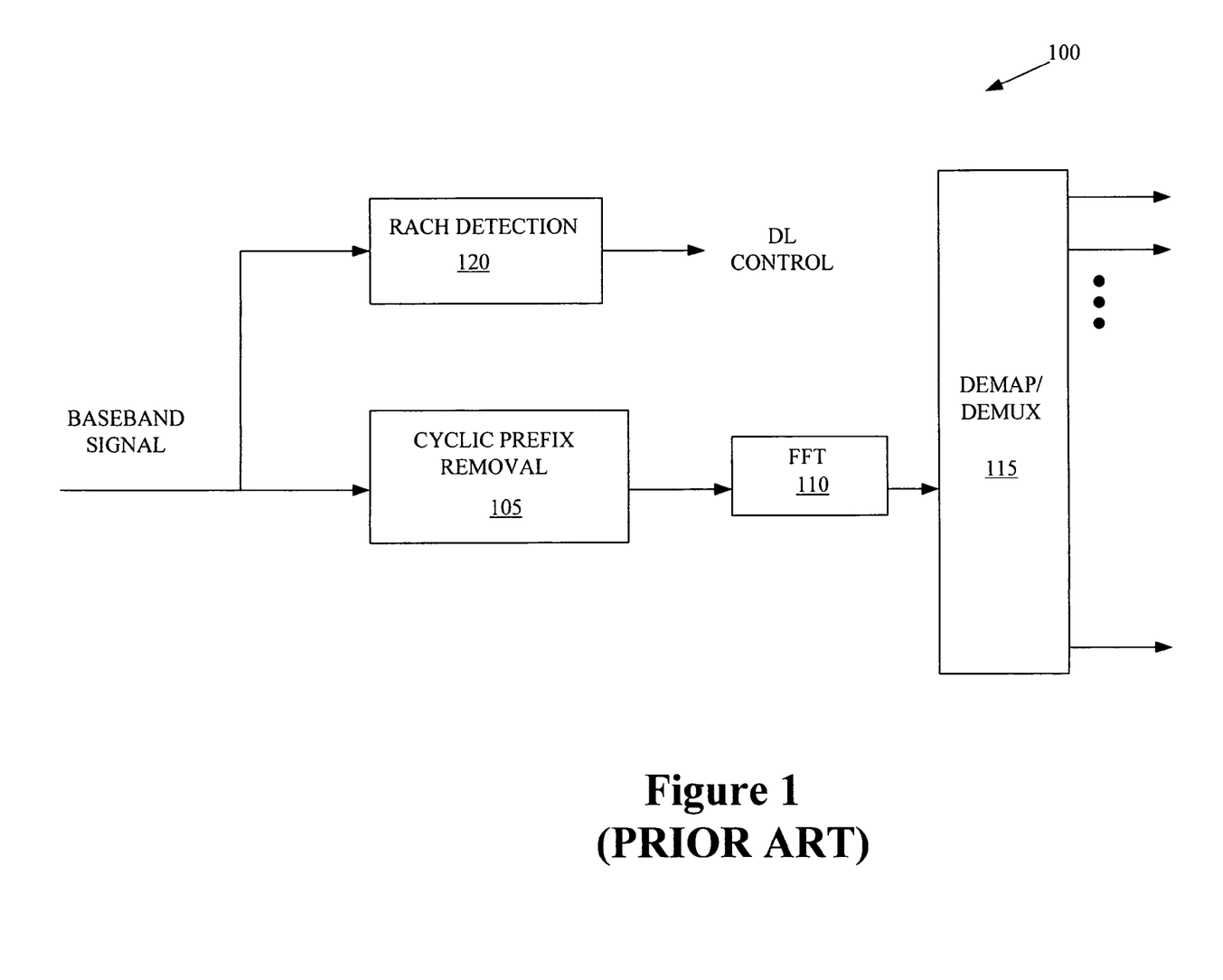
FIG. 1 conceptually illustrates a conventional process flow for extracting individual user signals from a multi-user superpositioned baseband signal.

FIG. 1 conceptually illustrates a conventional process flow 100 for extracting individual user signals from a multi-user super-positioned baseband signal. In the illustrated embodiment, a baseband signal including a superposition of multiple user signals is received at the base station. Cyclic prefixes in the received symbols are removed (at 105) from the baseband signal and then a fast Fourier transform (at 110) is performed to convert the baseband signal to the frequency domain. Resource block demapping and demultiplexing is performed (at 115) to segregate the data traffic signals for each user, uplink control channel, and random access (RACH) channel. A RACH detection process is also performed (at 120) on the baseband signal and the information provided by the RACH detection process is used for downlink control.

Figure 2:
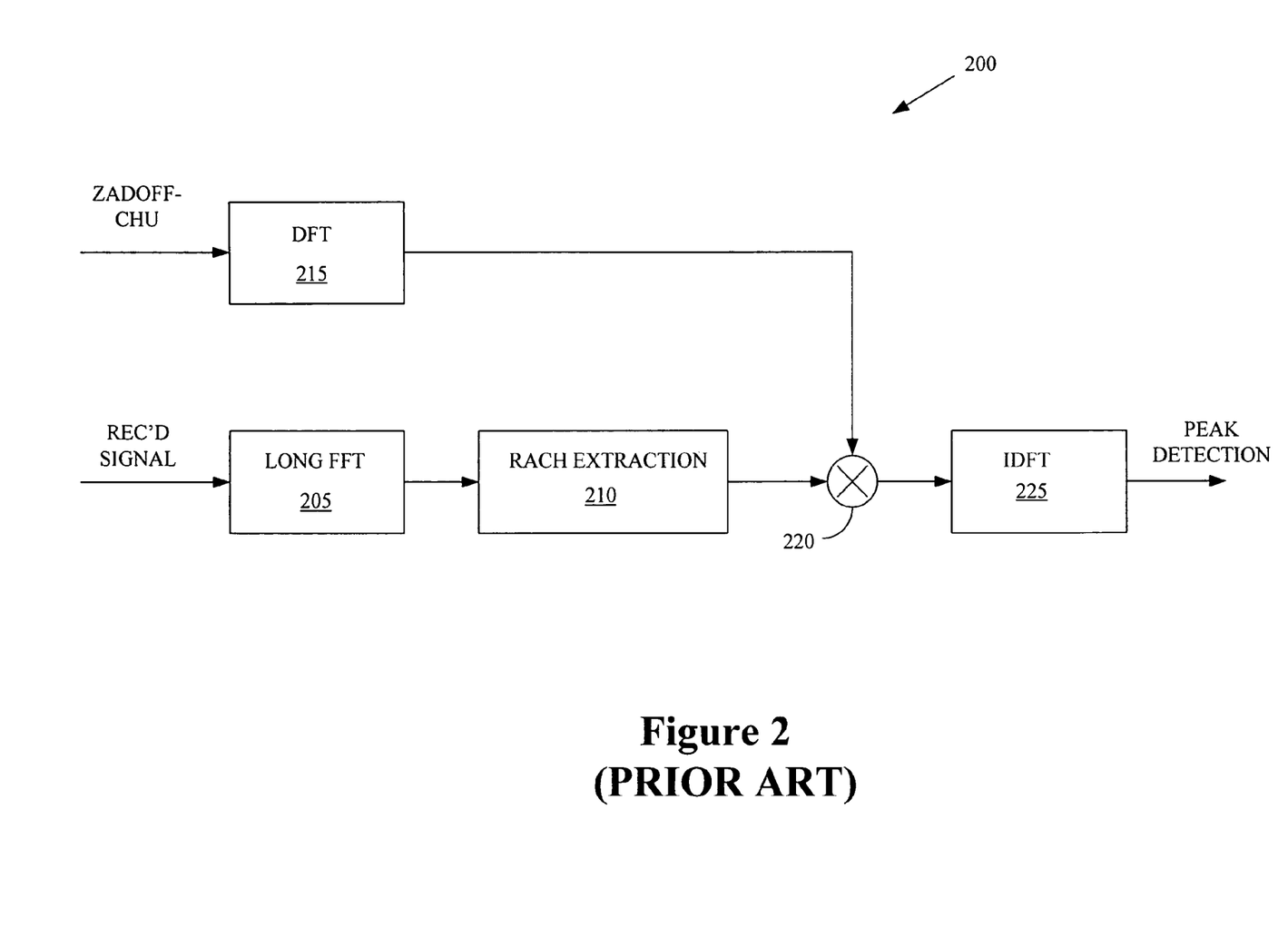
FIG. 2 conceptually illustrates a conventional process flow for performing RACH detection.

FIG. 2 conceptually illustrates a conventional process flow 200 for performing RACH detection. In the illustrated embodiment, a long fast Fourier transform is performed (at 205) on the received baseband signal to convert the received signals to the frequency domain. The RACH signals are extracted (at 210) from the frequency domain signal. A discrete Fourier transform is performed (at 215) on a Zadoff-Chu reference the sequence that corresponds to an expected RACH signal. The transformed Zadoff-Chu sequence is combined (at 220) with the extracted RACH signal and an inverse discrete Fourier transform is performed (at 225) on the combined signals. The results of the inverse discrete Fourier transform of the combined signals may then be provided to a peak detection algorithm to extract out the timing of the initial access signal from the non-synchronized RACH channel. A single FFT processor is commonly used for both data processing and the RACH detection. This approach assumes that the multi-user super positioned signals are perfectly time aligned, but this assumption is not always valid in practice.

A variety of factors may cause a frequency mismatch between the sub-carrier frequencies of signals transmitted by the mobile unit and the signals received at the base station. For example, the Doppler shift caused by relative motion of the mobile unit and the base station may introduce a frequency offset between the sub-carrier frequency of the signals received at the base station and the expected value of the sub-carrier frequency. For another example, inaccuracies in the oscillators used to generate the signal transmitted by the mobile unit and/or the oscillators used to generate the reference signal at the base station may introduce a frequency offset. The frequency offset causes misalignment between the subcarrier center frequency and the fast Fourier transform kernels used to process the received signals. Furthermore, the frequency offsets are typically different for each mobile unit. Consequently, the fast Fourier transform processing on the baseband signal, which operates on received signals that are down converted to the baseband using a local reference oscillator, may convolve signals transmitted on different sub-carrier frequencies and generate inter-carrier interference.

Figure 3:
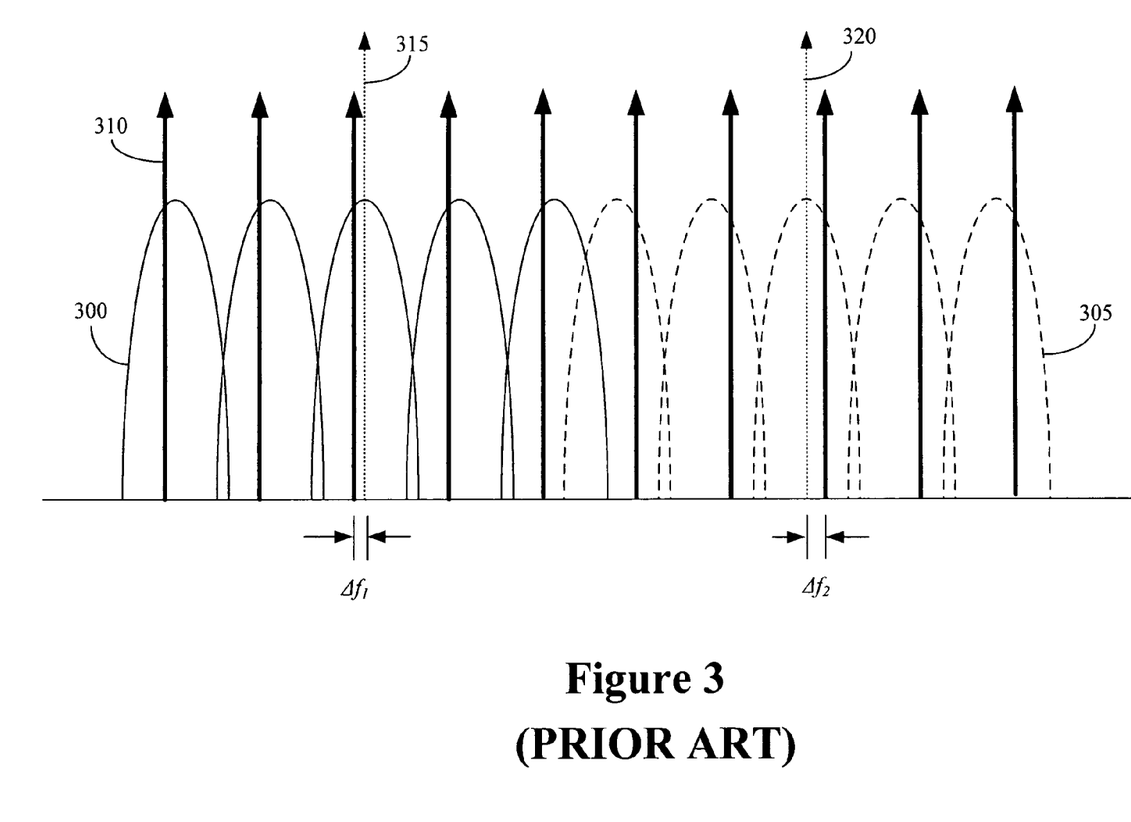
FIG. 3 conceptually illustrates subcarrier frequencies associated with two users.

FIG. 3 conceptually illustrates subcarrier frequencies associated with two users. In the illustrated embodiment, each frequency band includes five subcarrier frequency bands 300, 305. The subcarrier frequency bands 300 associated with the first user are indicated by solid lines and the subcarrier frequency bands 305 associated with the second user are indicated by dashed lines. The reference frequencies employed by the receiver for performing various Fourier transforms associated with the subcarrier frequency bands are indicated by boldfaced arrows 310. The center frequency 315 of the first carrier frequency band is offset from the reference frequencies 310 by a frequency offset $\Delta f_1$ and the center frequency 320 of the second carrier frequency band is offset from the reference frequencies 310 by a frequency offset $\Delta f_2$. These frequency offsets for each user create a convolving effect in the fast Fourier transform processing, which generates inter-carrier interference between the carrier/subcarrier frequency bands 300, 305. The inter-carrier interference is approximately proportional to the degree of the frequency offset.

Referring back to FIG. 1, the inter-carrier interference generated by convolution of signals in different subcarrier frequency bands occurs primarily within the resource block 115 following the fast Fourier transform processing 110. Consequently, frequency offset estimation is usually performed using the extracted pilot symbol for each user after the resource block demapping and user demultiplexing 115. For example, a multi-tap filter may be used to compensate for the convolving effect of frequency offsets to reduce the inter-carrier interference. The frequency offset compensation for each pilot and data subcarrier is performed before the channel estimation and equalization, which requires a high complexity deconvolution operation (such as multi-tap filtering) to remove the inter-carrier interference after FFT processing 110. Thus, when deconvolution operations are needed to compensate for the effects of frequency offsets, the conventional techniques for removing inter-carrier interference significantly increase the complexity of the OFDMA baseband processing. Larger frequency offsets require increasing the number of taps to cover more subcarrier frequencies and therefore increasing the complexity of the processing required to perform these operations. Furthermore, the multi-tap filters must be applied to signals associated with each user after the fast Fourier transform processing 110.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for processing a baseband signal including user signals transmitted by a plurality of users. The method includes applying frequency offset compensations to the baseband signal to form respective frequency-shifted baseband signals. Each frequency compensation shifts the baseband signal by a multiple of a selected frequency offset and each resulting frequency-shifted baseband signal includes frequency-shifted user signals. The method also includes assigning at least some of the frequency-shifted user signals to groups. Each group corresponds to one of the frequency compensations and the assignment is carried out so that each group includes frequency-shifted user signals that have an estimated frequency offset that lies within a range determined by the corresponding frequency compensation. The method further includes estimating a frequency offset of each of the user signals based on the frequency-shifted user signal and the frequency compensation of the group including the frequency-shifted user signal.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 4:
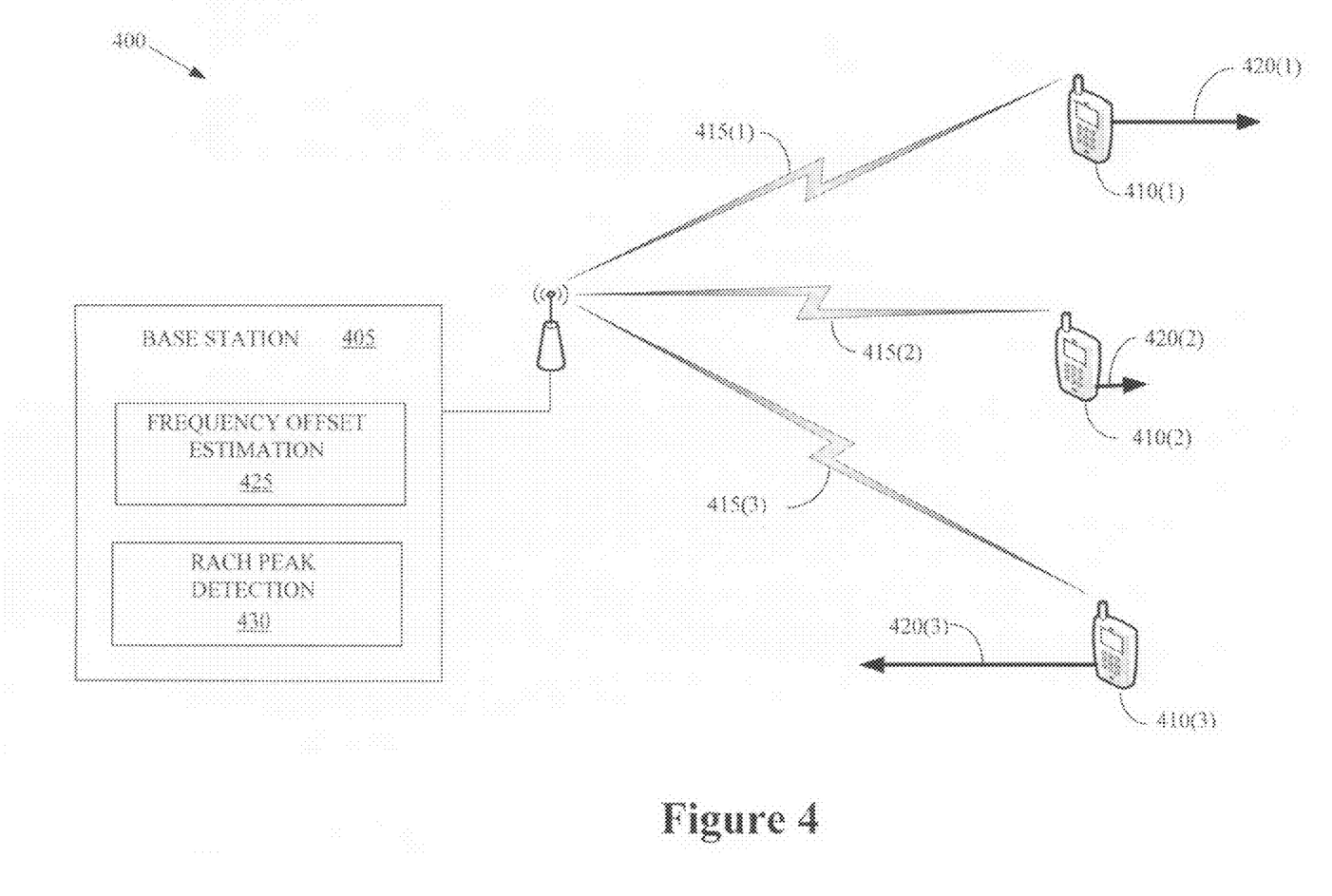
FIG. 4 conceptually illustrates one exemplary embodiment of a wireless communication system, in accordance with the present invention.

FIG. 4 conceptually illustrates one exemplary embodiment of a wireless communication system 400. In the illustrated embodiment, the wireless communication system 400 includes one or more base stations 405 for providing wireless connectivity to an associated geographic area or cell. The base station 405 provides wireless connectivity according to the multi-user single channel frequency division multiple access and/or orthogonal frequency division multiple access (SC-FDMA/OFDMA) standards and/or protocols. However, persons of ordinary skill in the art having benefit of the present disclosure should appreciate that the present invention is not limited to base stations 405 that operate according to the SC-FDMA/OFDMA standards and/or protocols. In alternative embodiments, other standards and/or protocols may be used to provide wireless connectivity. Furthermore, the present invention is not limited to using base stations 405 to provide wireless connectivity. In alternative embodiments, access networks, access points, base station routers, or other devices may be used to provide wireless connectivity.

Mobile units 410(1-3) (which may also be referred to as users) may access the wireless communication system 400 by establishing wireless communication links 415(1-3) with the base station 405. The distinguishing indices (1-3) may be dropped when referring collectively to the mobile units 410 and/or the wireless communication links 415. This convention may be applied to other elements shown in the drawings and referred to using an identifying numeral and one or more distinguishing indices. The wireless communication links 415 operate according to SC-FDMA/OFDMA and therefore support channels within a range of frequencies centered on a selected carrier frequency. The channels are assigned to orthogonal subcarriers within the carrier frequency band. Techniques for establishing, operating, and/or tearing down the wireless communication links 415 according to SC-FDMA/OFDMA (or any other set of standards and/or protocols that use orthogonal carrier/subcarrier frequencies to define communication channels over an air interface) are known in the art and in the interest of clarity only those aspects of establishing, operating, and/or tearing down the wireless communication links 415 that are relevant to the present invention will be discussed herein.

Under ideal circumstances, e.g., perfectly stationary mobile units 410 that transmit at precisely specified carrier/subcarrier frequencies, the channels supported by the subcarriers are completely orthogonal. However, these ideal circumstances are rarely (if ever) achieved in practice. In the illustrated embodiment, the mobile units 410 move with velocities indicated by the arrows 420. The velocity 420(1) is larger than the velocity 420(2) and both of these velocities 420(1-2) are directed away from the base station 405, whereas the velocity 420(3) is directed towards the base station 405. Consequently, transmissions over the air interfaces 415 are Doppler shifted by different amounts, which causes the frequencies of signals received over the air interfaces 415 to differ from the transmission frequencies of the signals. Both the base station 405 and the mobile units 410 expect to transmit and receive signals at predetermined subcarrier frequencies and the Doppler shifting therefore leads to frequency offsets between the expected subcarrier frequency and the actual received subcarrier frequency. Furthermore, differences in environmental conditions and/or internal circuitry of the mobile units 410 and/or the base station 405 may also generate frequency offsets.

Figure 5:
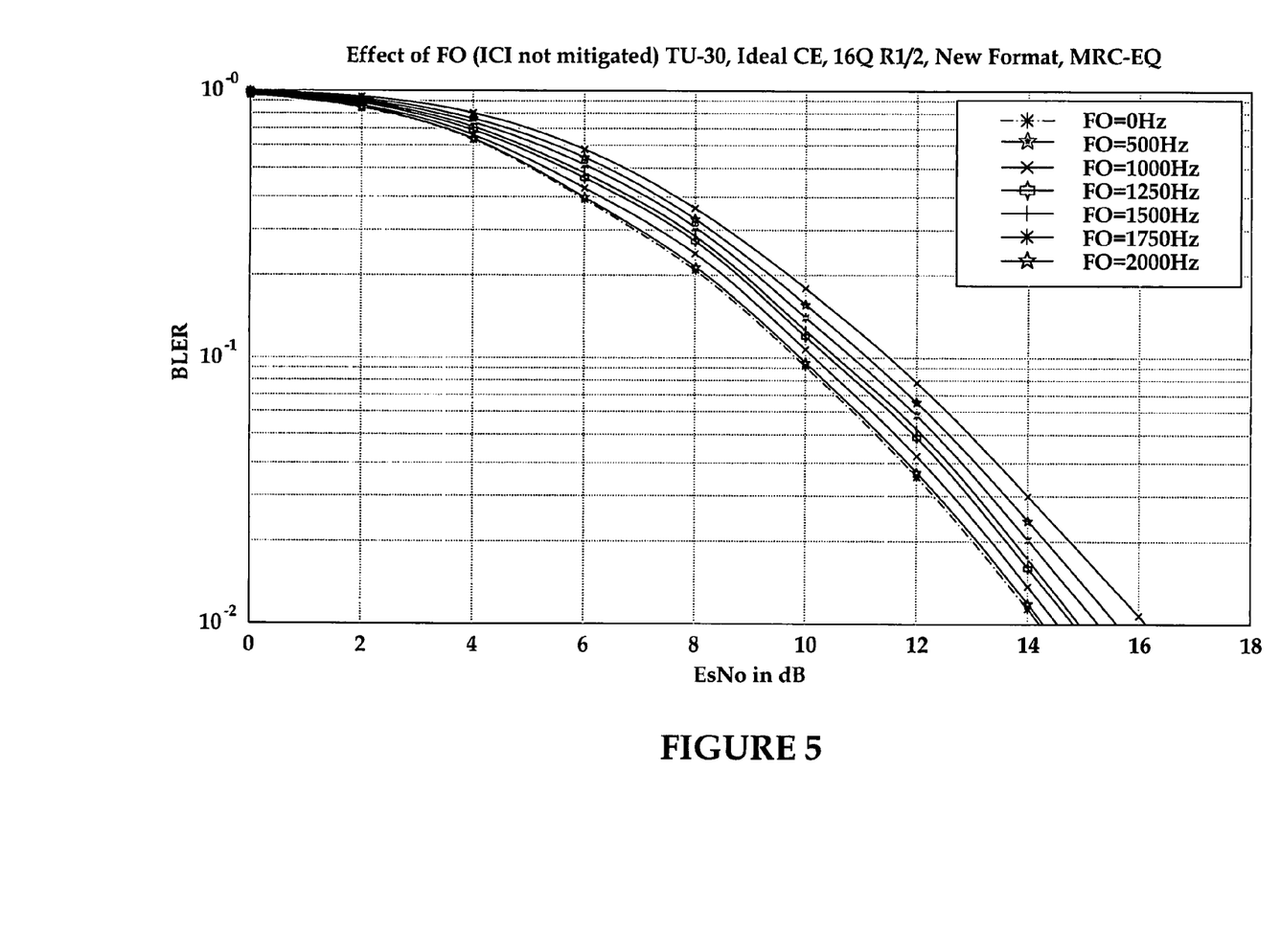
FIG. 5 shows an example of the block error rate (BLER) performance degradation due to the inter-carrier interference with respect to the frequency offset errors.
Figure 6:
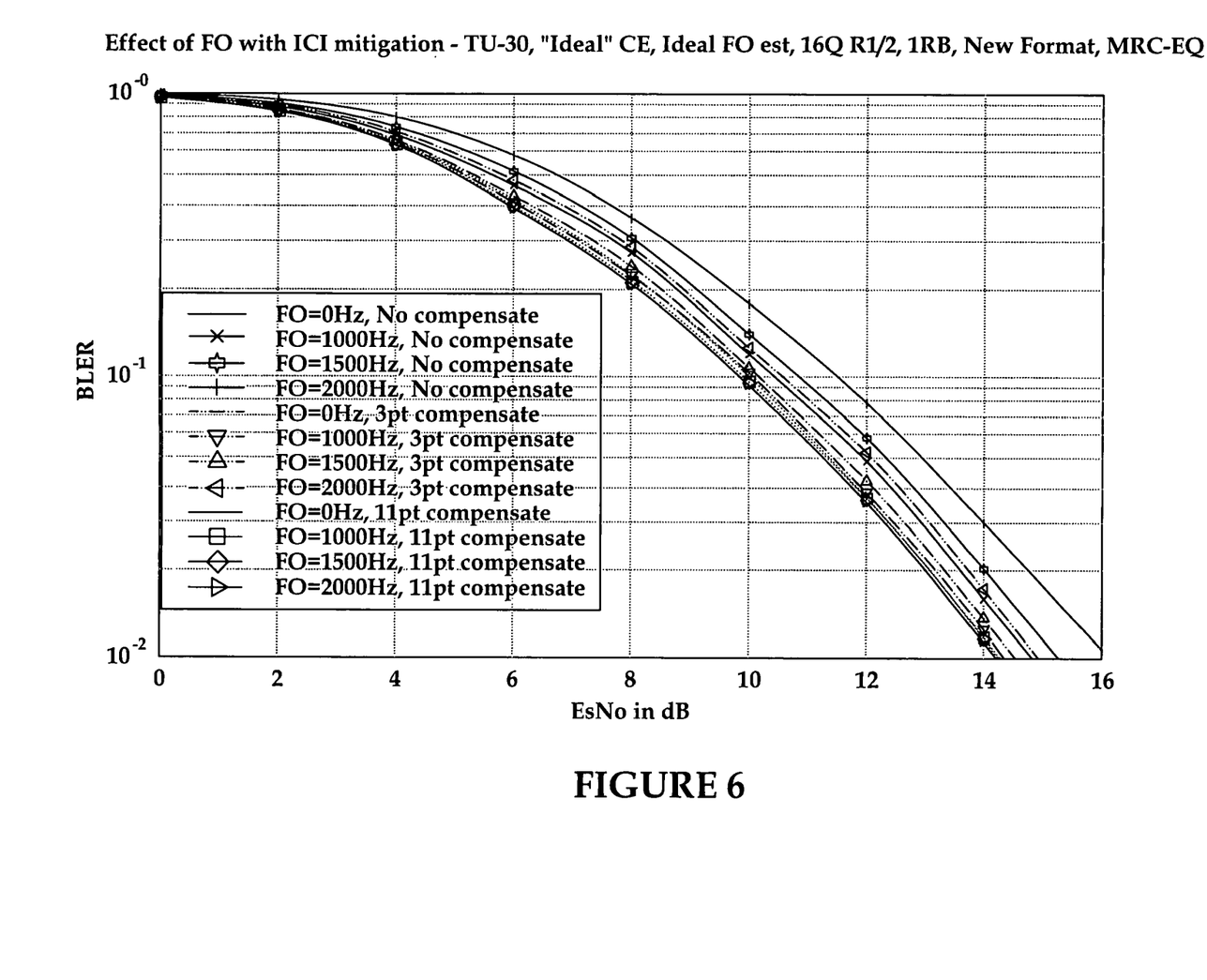
FIG. 6 illustrates the BLER performance improvement by single tap, 3 tap, and 11 tap convolution of frequency offset compensation.

Frequency offsets can lead to performance degradation, which is primarily caused by inter-carrier interference. The performance degradation caused by inter-carrier interference is a function of the frequency offset errors for each of the mobile units 410. FIG. 5 shows an example of the block error rate (BLER) performance degradation due to the inter-carrier interference with respect to the frequency offset errors. The performance degradation rises up to 2 dB at BLER=$10^{-2}$ when the frequency offset is 2000 Hz and the BLER performance degradation is negligible when the frequency offset is below 500 Hz. FIG. 6 illustrates the BLER performance improvement by single tap, 3 tap, and 11 tap convolution of frequency offset compensation. The BLER performance is improved when longer taps are used. However, the complexity of the implementation also increases as the number of the taps of the convolution operation increases. FIGS. 5 and 6 also demonstrate that single tap frequency offset compensation is sufficient to reduce the BLER performance degradation to negligible levels for frequency offset in the range ±500 Hz. However, persons of ordinary skill in the art having benefit of the present disclosure should appreciate that this particular frequency offset range is exemplary and not intended to limit the present invention. Depending on the configuration of the elements of the wireless communication system 400, the range of frequency offsets that can be adequately compensated by single tap frequency offset compensation may vary from the exemplary range of ±500 Hz.

In the illustrated embodiment, the base station 405 includes a frequency offset estimation unit 425. The multi-user data stream received over the air interfaces 415 is provided to the frequency offset estimation unit 425, which then divides the data stream into a plurality of parallel data streams. A different frequency compensation is then applied to each of the plurality of parallel data streams. For example, the multi-user data stream may be divided into three parallel data streams and one of the parallel data streams may be processed without any frequency compensation. The other two parallel data streams may be shifted by frequencies of ±1000 Hz. The frequency compensation applied to each of the parallel data streams may compensate for a portion of the frequency offset of the signals received from the mobile units. For example, after frequency compensation, the net frequency offset of signals received from a mobile unit 410 that has a frequency offset of 1300 Hz will be 1300 Hz with no frequency compensation, 300 Hz with a frequency compensation of 1000 Hz, and 2300 Hz with a frequency compensation of −1300 Hz.

As discussed above, the complexity of frequency offset estimation can be significantly reduced when the expected frequency offset is within a limited range, e.g., ±500 Hz. The frequency offset estimation unit 425 may therefore form different parallel data streams having different frequency compensations. For example, if the mobile unit 410(2) had a previously determined frequency offset within the range ±500 Hz, then the frequency offset estimation unit 425 may select signals for the mobile unit 410(2) from the parallel data stream that received no frequency compensation. For another example, if the mobile unit 410(1) had a previously determined frequency offset of approximately −1300 Hz, then the frequency offset estimation unit 425 may select signals for the mobile unit 410(1) from the parallel data stream that received a frequency compensation of −1000 Hz, so that the net frequency offset is expected to be approximately −300 Hz. For yet another example, if the mobile unit 410(3) had a previously determined frequency offset of approximately 1300 Hz, then the frequency offset estimation unit 425 may select signals for the mobile unit 410(3) from the parallel data stream that received a frequency compensation of 1000 Hz, so that the net frequency offset is expected to be approximately 300 Hz.

If the frequency offsets for all of the mobile units 410 are within a range of approximately ±1500 Hz, then the frequency offset estimation unit 425 can shift signals for all the mobile units 410 to a net frequency offset within the limited range that can be processed using a single tap filter. In one embodiment, the frequency offset estimation unit 425 may be able to choose the number of parallel data streams that are used to process the received signal. For example, additional parallel data streams having a broader range of frequency compensation may be included for processing the received signals if the frequency offset estimation unit 425 determines that the mobile units 410 have a very large range of frequency offsets. Similarly, the frequency offset estimation unit 425 may reduce the number of parallel data streams if the mobile units 410 are expected to have a relatively small range of frequency offsets. The frequency offset estimation unit 425 may also be able to adjust the values of the frequency compensations used by the parallel data streams, e.g., based on information indicating an expected range of frequency offsets for the mobile units 410. In one embodiment, the number of the FFT processors is dynamically determined by the number of frequency offset groups and the expected frequency offset range. For example, if the tolerable frequency offset before the FFT processing is ±500 Hz, three FFT processors may be used to cover up to ±1500 Hz of frequency offset. The 3 FFT processors contain one group for zero compensation, the other group for +1000 Hz and another group for −1000 Hz frequency offset compensations. Alternatively, if most of frequency offsets are within ±500 Hz, one FFT processor will be needed for as long as the frequency offsets remain within ±500 Hz.

The base station 405 also includes a random access channel (RACH) peak detection unit 430 that is used to estimate a peak in the delay time associated with pilot signals received from the mobile units 410. The performance of the peak detection unit 430 can be degraded by the large frequency offsets created by Doppler shifts of mobile units 410 that are highly mobile. Accordingly, the peak detection unit 430 may divide the received pilot signals into multiple parallel pilot signal data streams. Frequency compensation is performed on the multiple parallel pilot signal data streams. In one embodiment, the frequency offset compensation may be performed on the parallel pilot signal data streams using the same functionality that is used to perform frequency offset compensation on the multiple parallel data streams in the frequency offset estimation unit 425. Peak detection may then be performed for the RACH preamble signals provided by each mobile unit 410 in each of the parallel RACH preamble signal data streams and the strongest peak for each mobile unit 410 is identified as the best estimate of the delay time associated with the mobile unit 410.

The strongest peak should also correspond to the preferred value of the frequency offset compensation for the corresponding mobile unit 410. For example, three parallel pilot signal data streams may be formed and frequency offset compensations of 0 and ±1000 Hz may be applied. If the strongest peak in the delay time estimate corresponds to a frequency compensation of 1000 Hz, then this may indicate that the associated mobile unit 410 has a frequency offset that is relatively close to 1000 Hz. This information may be used to select the appropriate data stream in the frequency offset estimation unit 425.

Figure 7:
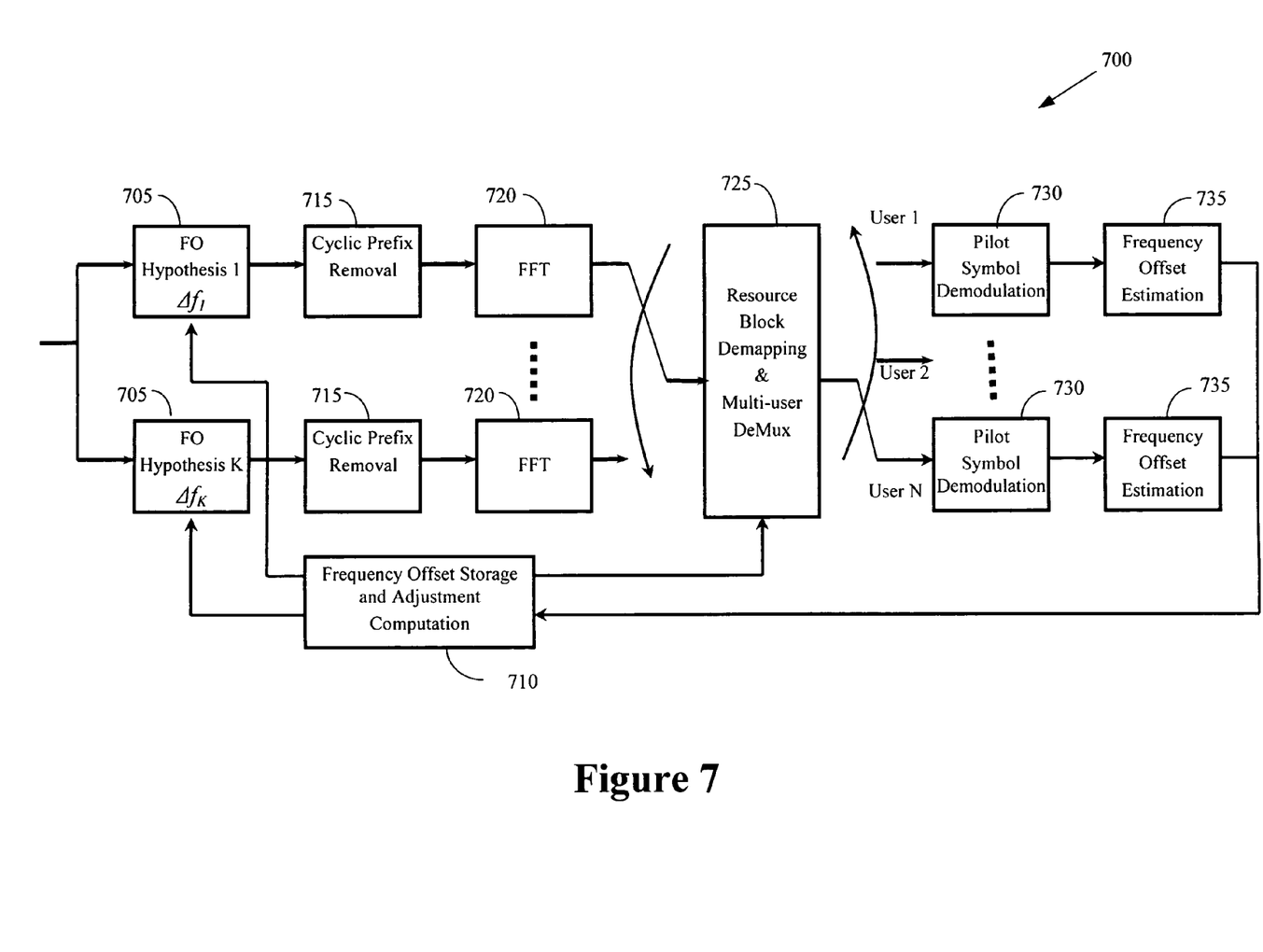
FIG. 7 conceptually illustrates one exemplary embodiment of a frequency offset estimation unit, in accordance with the present invention.

FIG. 7 conceptually illustrates one exemplary embodiment of a frequency offset estimation unit 700. Persons of ordinary skill in the art having benefit of the present disclosure should appreciate that the frequency offset estimation unit 700, as well as the elements of the unit 700, may be implemented in hardware, firmware, software, or any combination thereof. Furthermore, the various functional entities shown in FIG. 7 may be implemented as shown or may be combined with or incorporated into other elements. In the illustrated embodiment, a received baseband signal is divided into multiple parallel baseband data streams and each of the parallel baseband data streams is provided to a frequency offset (FO) element 705. Each of the frequency offset elements 705 applies frequency compensation ($\Delta f_1$, $\Delta f_k$) to the data stream to form a frequency-shifted data stream. Each of the frequency offset compensations represents a different hypothesis regarding the range of frequency offsets associated with one or more of the user signals present in the received baseband signal.

A frequency offset storage and adjustment computation element 710 may determine and/or provide values of the frequency compensations. In one embodiment, the element 710 may perform functions including selecting the frequency offsets, selecting the number of frequency offsets, selecting the range of frequency offsets, and the like. For example, the element 710 may determine the number of the FFT processors to be used to for each sub-frame based on the scheduled users' frequency offset and pre-configured tolerable performance degradation caused by the range of the frequency offset. The element 710 may receive information indicating previously determined frequency offsets for different users and may use this information to determine the frequency compensation information.

Each frequency-shifted data stream is then provided to a cyclic prefix removal element 715 for removal of the cyclic prefixes from the data stream and then the data stream is provided to a fast Fourier transform (FFT) element 720. The fast Fourier transform element 720 converts the parallel baseband signals from the time domain into the frequency domain and then provides the frequency domain parallel baseband signals to a resource block demapping and multi-user demultiplexing element 725. The parallel baseband signals received at the element 725 include signals corresponding to each user and each frequency compensation value. Thus, once the resource blocks in the parallel data streams provided by the fast Fourier transform element 720 have been demapped and the multiple user signals demultiplexed, the element 720 can select one of the frequency-shifted user signals so that the net frequency offset of the selected frequency-shifted user signal is within a predetermined range. In one embodiment, the element 720 utilizes previously determined frequency offsets provided by the element 710 to select the appropriate frequency-shifted user signal. For example, if the frequency offset of one user was previously determined to be 1200 Hz (either in a previous frequency offset estimation or as part of the RACH peak detection process), then the element 720 may select signals associated with the user from a data stream that received a frequency offset compensation of 1000 Hz.

The selected frequency-shifted user signals are then grouped by the associated value of the frequency compensation and provided to a pilot symbol demodulation element 730 and a frequency offset estimation element 735. In one embodiment, the frequency offset estimation element 735 implements a single tap filter for estimating the net frequency offset for each of the users in the group. Once the net frequency offset has been determined, then the value of the frequency compensation can be combined with the net frequency offset to determine the frequency offset for each of the users. For example, if the net frequency offset for one user is 200 Hz and the user is a part of the 1000 Hz frequency compensation group, then the frequency offset for this user is approximately 1200 Hz. The determined frequency offset may then be provided to the element 710 for storage and/or use in selecting the subsequent frequency compensation by use and/or selecting the appropriate data streams in the element 725.

Figure 8:
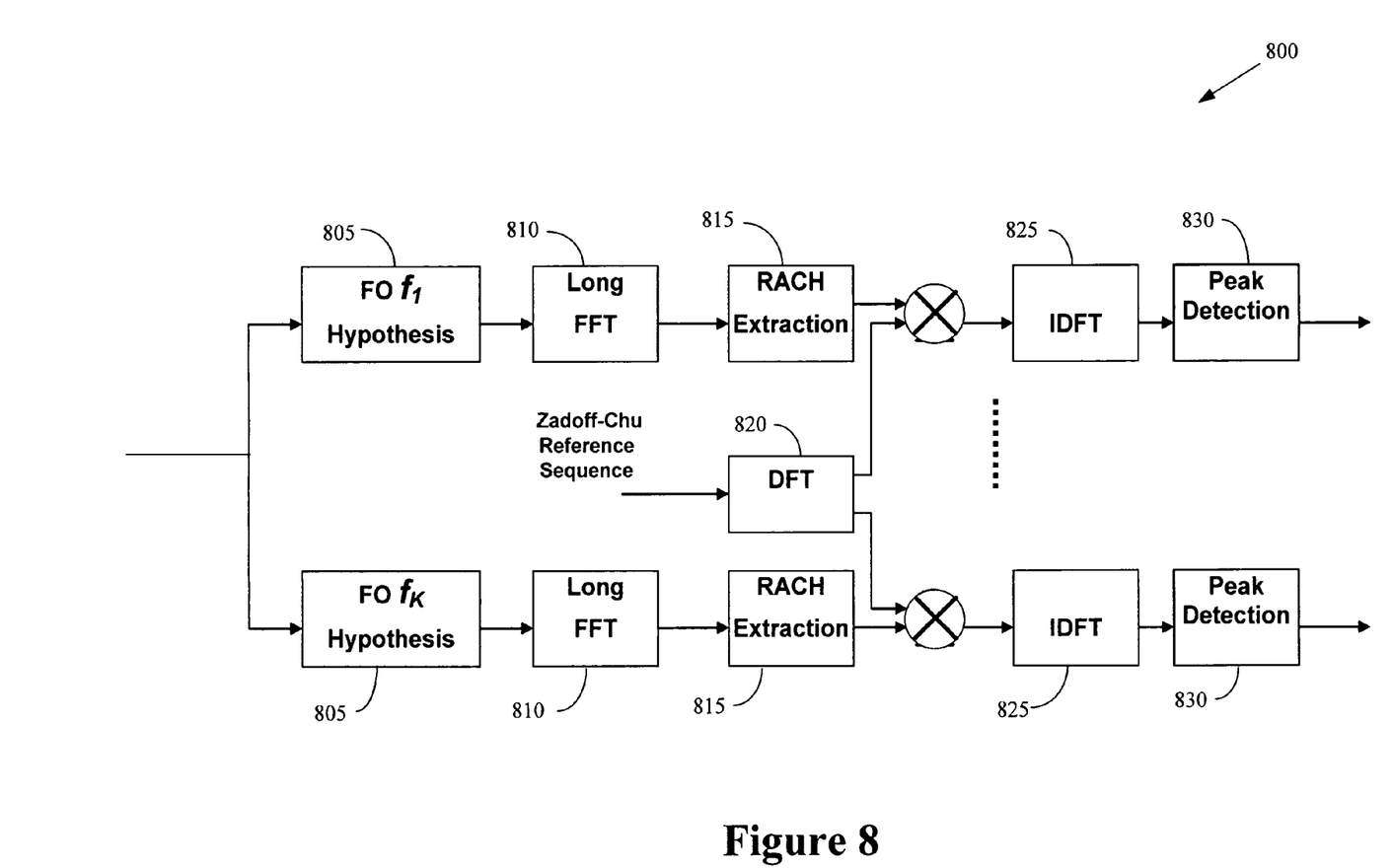
FIG. 8 conceptually illustrates one exemplary embodiment of a RACH peak detection element, in accordance with the present invention.

FIG. 8 conceptually illustrates one exemplary embodiment of a RACH peak detection element 800. Persons of ordinary skill in the art having benefit of the present disclosure should appreciate that the RACH peak detection element 800, as well as the elements of the element 800, may be implemented in hardware, firmware, software, or any combination thereof. Furthermore, the various functional entities shown in FIG. 8 may be implemented as shown or may be combined with or incorporated into other elements. In the illustrated embodiment, a received signal (including pilot signals transmitted by one or more users) is divided into multiple parallel pilot signal data streams and each of the parallel pilot signal data streams is provided to a frequency offset (FO) element 805. Each of the frequency offset elements 805 applies frequency offset compensation ($\Delta f_1$, $\Delta f_k$) to the data stream to form a frequency-shifted data stream. Each of the frequency compensations represents a different hypothesis regarding the range of frequency offsets associated with one or more of the pilot signals present in the received signal. In one embodiment, the frequency offset elements 805 may be shared with frequency offset compensation elements, such as the frequency compensation element 700. However, this is not required for the practice of the present invention.

A long fast Fourier transform element 810 is used to transform each of the frequency-shifted pilot signal data streams from the time domain to the frequency domain. The RACH signal extraction is then performed in an extraction element 815 and the pilot signal sequences are identified by combining the RACH signal with a discrete Fourier transform of one or more reference sequences, such as Zadoff-Chu sequences, which may be provided by a discrete Fourier transform (DFT) element 820. An inverse discrete Fourier transform (IDFT) element 825 is used to convert the extracted pilot signal sequences from the frequency domain back into the time domain and then a peak detection element 830 is used to determine the peak value of the time delay for each of the user signals. Each user will have multiple peak values determined using the different parallel preamble signal data streams and the strongest peak will be selected from these multiple peak values. Furthermore, the selected peak will also correspond to a frequency offset or frequency compensation value. This value may then be used as an estimate of the frequency offset for this user, e.g., by a frequency compensation element 700 shown in FIG. 7.

Embodiments of the techniques described herein may have a number of advantages over conventional practice. The multiple FFT processing scheme described herein may allow time-domain frequency offset compensation for data and RACH processing over a wide range of frequencies using a significantly simpler architecture. For example, the operations performed in the scheme described herein can be done with a single tap filter, which is significantly simpler than the convolution operations using multiple tap filters that are required in conventional practice. The proposed scheme therefore limits the performance degradation caused by frequency offset to a tolerable range without necessarily performing convolution operations for each user. The proposed scheme for RACH detection also improves the detection performance for users with high mobility.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method of processing a baseband signal comprising user signals transmitted by a plurality of users, comprising:
    applying frequency offset compensations to the baseband signal, thereby to form respective frequency-shifted baseband signals, wherein each frequency compensation shifts the baseband signal by a multiple of a selected frequency offset and each resulting frequency-shifted baseband signal comprises frequency-shifted user signals;
    assigning at least some of the frequency-shifted user signals to groups, wherein each group corresponds to one of the frequency compensations and the assignment is carried out so that each group includes frequency-shifted user signals that have an estimated frequency offset that lies within a range determined by the corresponding frequency compensation; and
    estimating a frequency offset of each of the user signals based on the frequency-shifted user signal and the frequency compensation of the group including the frequency-shifted user signal.

2. The method of claim 1, comprising selecting the frequency compensations and the frequency offset.

3. The method of claim 2, wherein selecting the frequency compensations comprises selecting a zero frequency compensation, at least one positive frequency compensation having a magnitude that is an integer multiple of the selected frequency offset, and at least one negative frequency compensation having a magnitude that is an integer multiple of the selected frequency offset.

4. The method of claim 2, wherein selecting the frequency compensations and the frequency offset comprises selecting the frequency compensations and the frequency offset based upon at least one of a previously determined frequency offset of a user signal and a pre-configured tolerable range of the frequency offset.

5. The method of claim 1, wherein assigning at least some of the frequency-shifted user signals to groups comprises assigning each of the frequency-shifted user signals to one of the groups based upon previously determined frequency offsets associated with each of the users.

6. The method of claim 5, wherein assigning each of the frequency-shifted user signals to one of the groups comprises assigning each of the frequency-shifted user signals to one of the groups based upon at least one of a frequency offset determined using a pilot signal or a frequency offset previously determined using a previous frequency-shifted user signal and a frequency compensation of a group including the previous frequency-shifted user signal.

7. The method of claim 5, wherein assigning at least some of the frequency-shifted user signals to groups comprises assigning each of the frequency-shifted user signals to one of the groups following fast Fourier transform processing of the frequency-shifted baseband signal.

8. The method of claim 1, comprising estimating frequency offsets for each of the users using the pilot signals provided by each of the plurality of users.

9. The method of claim 8, wherein estimating the frequency offsets for each of the users comprises applying the frequency compensations to the pilot signal to form a corresponding plurality of frequency-shifted pilot signals.

10. The method of claim 9, comprising determining a peak time for each of the frequency-shifted pilot signals.

11. The method of claim 10, wherein estimating the frequency offset for each of the users comprises combining the peak time for each of the frequency-shifted pilot signals and the frequency compensation for each of the pilot signals.

12. The method of claim 1, wherein estimating the frequency offset of each of the user signals comprises applying a single tap filter to the frequency-shifted user signal to determine a relative frequency offset that indicates the frequency offset relative to the frequency compensation of the corresponding group.

13. The method of claim 12, wherein estimating the frequency offset of each of the user signals comprises combining the relative frequency offset and the frequency compensation of the group including the frequency-shifted user signal.

\* \* \* \* \*